(12) United States Patent
Makartchouk et al.

(10) Patent No.: US 11,629,624 B1
(45) Date of Patent: Apr. 18, 2023

(54) DEF THAWING APPARATUS AND METHOD FOR DIESEL ENGINE SCR SYSTEMS

(71) Applicant: International Engine Intellectual Property Company, LLC, Lisle, IL (US)

(72) Inventors: Andrei Makartchouk, Hinsdale, IL (US); Joseph Domenico, Downers Grove, IL (US); Tallis Ingram, Glenview, IL (US); Steve Dickerson, Lake in the Hills, IL (US); Louis Maza, Plainfield, IL (US); Paul Laurence Berke, Chicago, IL (US); Vijayasarathy Subramanian, Winfield, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 17/692,005

(22) Filed: Mar. 10, 2022

(51) Int. Cl.
*F01N 3/20* (2006.01)
*F01N 3/04* (2006.01)
(Continued)

(52) U.S. Cl.
CPC ............ *F01N 3/208* (2013.01); *F01N 3/04* (2013.01); *F01N 3/0205* (2013.01); *F01N 3/0234* (2013.01); *F01N 3/2066* (2013.01); *F01N 2240/02* (2013.01); *F01N 2240/16* (2013.01); *F01N 2610/10* (2013.01); *F01N 2610/102* (2013.01); *F01N 2610/14* (2013.01); *F01N 2610/1406* (2013.01); *F01N 2610/148* (2013.01); *F01N 2610/1486* (2013.01); *F01N 2900/1806* (2013.01); *F01N 2900/1811* (2013.01)

(58) Field of Classification Search
CPC combination set(s) only.
See application file for complete search history.

(56) References Cited

U.S. PATENT DOCUMENTS

| 7,647,767 B2 * | 1/2010 | Osaku | F01N 3/2066 60/301 |
| 10,830,120 B2 * | 11/2020 | Sekine | F01N 3/208 |

(Continued)

FOREIGN PATENT DOCUMENTS

CN 108425726 A * 8/2018

*Primary Examiner* — Binh Q Tran
(74) *Attorney, Agent, or Firm* — Mark C. Bach (57) ABSTRACT

A Diesel Emissions Fluid (DEF) Thawing arrangement is provided for use with a vehicle having an engine, an Engine Control Module (ECM), an exhaust system, and an SCR catalytic device. A DEF injection system is connected to the exhaust system and to the ECM. A DEF tank is connected to the DEF injection system. An exhaust pipe branch is connected to the exhaust system. A heat exchanging apparatus is connected to the exhaust pipe branch and is configured to exchange heat from exhaust gas within the exhaust pipe branch to the DEF in the DEF tank. The heat exchanging apparatus may be an exhaust gas to DEF heat exchanger located at least partially within the DEF tank, or may be an exhaust gas to coolant heat exchanger connected to an engine coolant circuit and a coolant to DEF heat exchanger located at least partially within the DEF tank.

21 Claims, 3 Drawing Sheets

(51) Int. Cl.
*F01N 3/023* (2006.01)
*F01N 3/02* (2006.01)

(56) References Cited

U.S. PATENT DOCUMENTS

| | | | |
|---|---|---|---|
| 2004/0040288 A1* | 3/2004 | Jacob | B01D 53/8631 60/301 |
| 2010/0319651 A1* | 12/2010 | Kasahara | F01N 3/2066 123/198 R |
| 2014/0286829 A1* | 9/2014 | Qi | F01N 3/208 422/112 |
| 2015/0128570 A1* | 5/2015 | Tomita | F01N 3/2006 60/284 |
| 2016/0298516 A1* | 10/2016 | Tomita | F01N 13/1805 |
| 2018/0258812 A1* | 9/2018 | De Cesare | F01N 3/2066 |

* cited by examiner

DEF THAWING APPARATUS AND METHOD FOR DIESEL ENGINE SCR SYSTEMS

BACKGROUND

This disclosure relates to an apparatus for thawing Diesel Emissions Fluid (DEF) during cold weather in vehicles having diesel engines and Selective Catalytic Reduction (SCR) emissions control systems and methods of use thereof. Particularly, this disclosure relates to an arrangement and method for quickly and efficiently thawing DEF in a controlled manner in diesel powered vehicles.

RELATED ART

Diesel engines commonly operate with a lean air to fuel ratio, so that only part of the available oxygen is used in the fuel combustion reaction. While this helps to make diesel engines efficient, it also results in the formation of nitrogen oxides (NOx), an undesirable pollutant, during the combustion process. Presently, the Environmental Protection Agency (EPA) regulates the amount of NOx that may be emitted in vehicle exhaust, so that vehicle and engine manufacturers employ various techniques to reduce NOx emissions.

A common technique to reduce NOx tailpipe emissions involves the use of Selective Catalytic Reduction (SCR). SCR works by injecting a solution of urea, a reductant that is sometimes referred to as Diesel Exhaust Fluid (DEF), into the flow of vehicle engine exhaust, often referred to as "dosing." Such DEF is commonly sold under the trademark AdBlue, or as ISO 22241 AUS325. The urea solution then evaporates and thermally decomposes due to the heat of the exhaust. Ammonia liberated from the urea then reacts with the NOx in the presence of a catalyst to form diatomic nitrogen (N2), water (H2O), and carbon dioxide (CO2). The catalyst is provided in the form of a structure, often a honeycomb shape or similar arrangement, with a coating such as a metal oxide or metal exchanged zeolites, located downstream in the exhaust flow from the location of urea injection. In order to maximize the effectiveness of the catalytic device, the evaporated urea and its thermal decomposition products, including the ammonia, must be properly mixed with the vehicle engine exhaust before entering the catalytic device. The SCR urea injector and catalytic device, together with a filter for removing particulates from the exhaust flow, generally located upstream in the exhaust flow from the SCR urea injector and catalytic device, are often collectively referred to as exhaust aftertreatment. DEF injection components are normally dependent on an external control module that may be an Engine Control Unit (ECU) or Diesel Control Unit (DCU), which control the quantity and timing of the DEF injection according to one or more algorithms.

Another technique to reduce NOx tailpipe emissions involves the use of Exhaust Gas Recirculation (EGR). EGR recirculates a percentage of exhaust gases back into the intake of the engine, in order to lower the amount of free oxygen in the intake air and to reduce the peak in-cylinder combustion temperatures. This, in turn, reduces the amount of NOx formation that takes place within the cylinders, while also reducing overall engine efficiency. Most modern diesel engines utilize both EGR and SCR, sometimes in combination with some form of combustion optimization.

DEF itself is an aqueous urea solution that may be made, for non-limiting example, with 32.5% urea and 67.5% deionized water. As such, the freezing point of DEF is −11° C. (12° F.). For the SCR system to function at low temperatures, therefore, a sufficient amount of the frozen DEF in the DEF trunk must be melted in as short time as possible, preferably within minutes of starting the vehicle. For example, 2010 EPA emissions requirements require full DEF flow within 70 minutes. Typically, the frozen DEF is melted by heat from the engine, often by way of engine coolant passing through a heat exchanger in the DEF tank. This method may take significant time before the SCR exhaust cleaning system is fully operational, possibly exceeding the required maximum time to full DEF flow under worst-case conditions.[1] This is due at least in part to the fact that the very efficiency of diesel engines results in comparatively low waste heat rejection by way of the engine cooling system. In other words, as compared to other types of internal combustion engines, proportionally less heat is available by way of the engine coolant.

Another method to thaw DEF is to integrate an electrical heater into the DEF tank. This heater must be sized, positioned, and powered adequately to rapidly melt sufficient frozen DEF. Furthermore, the heater must be self-regulating so that the heater does not exceed 50-60° C. (122-140° F.), as DEF begins to decompose at around 60° C. (140° F.).[2] This means that a $\neq^1$ Diesel Exhaust Fluid. 17 Nov. 2021. Retrieved 17 Nov. 2021. https://en.wikipedia.org/wiki/Diesel exhaust fluid $\neq_2$Id. sufficient amount of heat must be transferred to accomplish the task of melting the DEF, without exceeding the decomposition temperature at any point.

Accordingly, there is an unmet need for an arrangement and method for quickly and efficiently thawing DEF in a controlled manner in diesel powered vehicles.

SUMMARY

According to one embodiment of the DEF Thawing Apparatus and Method for Diesel Engine SCR Systems, a vehicle has an engine, an Engine Control Module (ECM) connected to the engine and configured to control the engine, an exhaust system connected to the engine, and an SCR catalytic device connected to the exhaust system. A DEF injection system is connected to the exhaust system upstream of the SCR catalytic device, and is further connected to the ECM. A DEF tank is connected to the DEF injection system. An exhaust pipe branch is connected to the exhaust system. A heat exchanging apparatus is connected to the exhaust pipe branch and is configured to exchange heat from exhaust gas within the exhaust pipe branch to the DEF in the DEF tank.

According to another embodiment of the DEF Thawing Apparatus and Method for Diesel Engine SCR Systems, a DEF Thawing Apparatus of a vehicle having an engine, an ECM connected to the engine and configured to control the engine, and an exhaust system connected to the engine and having an SCR catalytic device, includes a DEF injection system connected to the exhaust system upstream of the SCR catalytic device, and further connected to the ECM. The DEF Thawing Apparatus further includes a DEF tank connected to the DEF injection system. The DEF Thawing Apparatus further includes an exhaust pipe branch connected to the exhaust system. The DEF Thawing Apparatus further includes a heat exchanging apparatus connected to the exhaust pipe branch and configured to exchange heat from exhaust gas within the exhaust pipe branch to the DEF in the DEF tank.

According to yet another embodiment of the DEF Thawing Apparatus and Method for Diesel Engine SCR Systems, a method of thawing DEF in a vehicle having an engine, an ECM connected to the engine and configured to control the engine, an exhaust system connected to the engine and having an SCR catalytic device, and a DEF injection system connected to the exhaust system and having a DEF tank, includes several steps. The first step is connecting an exhaust pipe branch to the exhaust system. The second step is connecting a heat exchanging apparatus to the exhaust pipe branch. The third step is configuring the heat exchanging apparatus to exchange heat from exhaust gas within the exhaust pipe branch to the DEF in the DEF tank. The fourth step is providing an exhaust gas control valve in the exhaust pipe branch and connecting the exhaust gas control valve to the ECM. The fifth step is locating at least one exhaust temperature sensor in the exhaust system and/or in the exhaust pipe branch, and connecting the at least one exhaust temperature sensor to the ECM. The sixth step is locating at least one DEF temperature sensor within the DEF tank proximate to at least one component of the heat exchanging apparatus, and connecting the at least one DEF temperature sensor to the ECM. The seventh step is controlling the exhaust gas control valve by way of the ECM as a function of a temperature of exhaust flow within the exhaust system and/or within the exhaust pipe branch, and as a function of state of thaw and/or temperature of the DEF in the DEF tank.

DETAILED DESCRIPTION

Embodiments described herein relate to a DEF Thawing Apparatus for Diesel Engine SCR Systems, and to methods for the use thereof. Embodiments of the DEF Thawing Apparatus for Diesel Engine SCR Systems and their method of use may be applied to various types of passenger vehicles, recreational vehicles, and commercial vehicles, such as highway or semi-tractors with and without auxiliary power units (APUs), straight trucks with and without APUs, buses, fire trucks, agricultural vehicles, construction vehicles, campers, motorhomes, motorcycles, scooters, rail travelling vehicles, and trailers with APUs or refrigeration units. It is further contemplated that embodiments of the arrangement and method may be applied to vehicles having hybrid electric drive. It is further contemplated that, while presented herein as being used with diesel engines, embodiments of the arrangement and method may be applied to vehicles having engines configured for various fuels, such as, for non-limiting example, gasoline, diesel, propane, natural gas, and hydrogen, and particularly with respect to such engines being configured for lean-burn that use SCR.

Embodiments of the DEF Thawing Apparatus for Diesel Engine SCR Systems and their method of use considerably increase the speed and efficiency of DEF thawing under cold ambient temperatures. Specifically, embodiments of the DEF Thawing Apparatus for Diesel Engine SCR Systems, and their method of use, thaw DEF using hot exhaust gas flow from the vehicle engine. The hot exhaust gas flow may be used directly in an exhaust gas to DEF heat exchanger within the DEF tank. Alternately, an additional exhaust gas to coolant heat exchanger may be used, thereby providing for heat transfer from the hot exhaust gas to engine coolant, which heated engine coolant is then used in another heat exchanger to transfer heat between the heated engine coolant and the cold DEF in the DEF tank.

By increasing the speed and efficiency of DEF thawing under cold ambient temperatures, embodiments of the DEF Thawing Apparatus for Diesel Engine SCR Systems and their methods of use allow vehicles with SCR systems to better meet EPA emissions requirements. Because under cold ambient conditions the temperature of exhaust gas flow is considerably higher than the coolant temperature, the time of DEF thawing will be much faster utilizing embodiments of the DEF Thawing Apparatus for Diesel Engine SCR Systems and their methods of use than in traditional coolant based systems.

Figure 1:
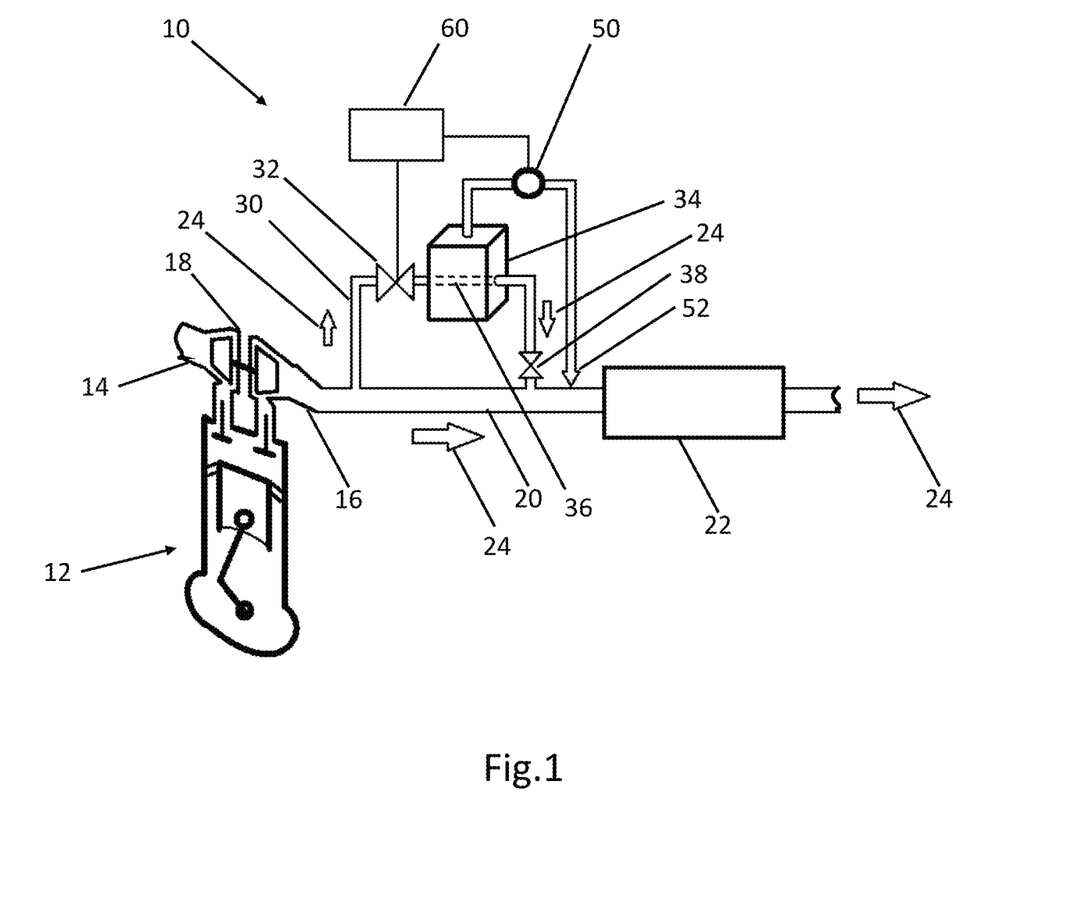
FIG. 1 is a graphic representation of an embodiment of the DEF Thawing Apparatus and Method for Diesel Engine SCR Systems according to the present disclosure, as described herein.

Referring now to FIG. 1, an embodiment of a DEF Thawing Apparatus 10 for Diesel Engine SCR Systems is shown. A diesel engine 12 is provided with an intake manifold 14 and an exhaust manifold 16. A turbocharger 18 may be used to extract energy from engine exhaust and to compress the intake air, although it is contemplated that the DEF Thawing Apparatus 10 may be used with an engine not having a turbocharger. An exhaust pipe 20 connects the exhaust manifold 16 to an SCR catalytic device 22. An exhaust pipe branch 30 is connected to the exhaust pipe 20, and directs some of exhaust flow 24 through an exhaust gas to DEF heat exchanger 36 located in DEF tank 34. A exhaust gas control valve 32 is provided in the exhaust pipe branch 30, and is connected to an Engine Control Module (ECM) 60.

The ECM 60 may control the amount or percentage that the exhaust gas control valve 32 opens, in such a way as to provide sufficient exhaust flow 24 to pass through the exhaust gas to DEF heat exchanger 36 to quickly and efficiently melt the DEF within the DEF tank 34 without exceeding the decomposition temperature of the DEF at any point along the exhaust gas to DEF heat exchanger 36. To allow the ECM 60 to determine how much exhaust flow 24 to allow to pass through the exhaust gas to DEF heat exchanger 36 by way of the exhaust gas control valve 32, the ECM 60 may receive temperature measurements from temperature sensors (not shown) located within the exhaust flow 24 in the exhaust manifold, within the exhaust flow 24 in the exhaust pipe 20, within the exhaust flow 24 in the exhaust pipe branch 30, and/or within exhaust flow 24 in the exhaust gas to DEF heat exchanger 36. The ECM 60 may further receive temperature measurements of the DEF from temperature sensors (not shown) located at one or more locations within the DEF tank 34, which may also be used by the ECM 60 to determine how much exhaust flow 24 to allow to pass through the exhaust gas to DEF heat exchanger 36.

In order to prevent backflow of the exhaust, the DEF Thawing Apparatus 10 may be provided with a check valve 38 located within the exhaust pipe branch 30 after the exhaust gas to DEF heat exchanger 36. The ECM 60 is further connected to a DEF pump 50 and/or to a DEF injector 52 upstream of the SCR catalytic device 22, in order to control the injection of DEF into the exhaust flow 24. The ECM 60 may further manage injection of DEF into the exhaust flow 24 as a function of the temperature of the exhaust flow 24, and/or the state of thaw and/or temperature of the DEF in the DEF tank 34. As a non-limiting example, once the DEF in the DEF tank 34 is sufficiently thawed, the ECM 60 may partially or completely close the exhaust gas control valve 32, thereby restricting exhaust flow 24 through the exhaust gas to DEF heat exchanger 36, and then activate the DEF pump 50 and DEF injector 52 to inject DEF into the exhaust flow 24 as it enters the SCR catalytic device 22. It is further contemplated that the ECM 60 may activate the DEF pump 50 and DEF injector 52, either fully or partially, while exhaust continues to flow through the exhaust gas to DEF heat exchanger 36, in various algorithmic proportions between exhaust flow 24, exhaust temperature, DEF temperature, and amount of DEF injected.

Figure 2:
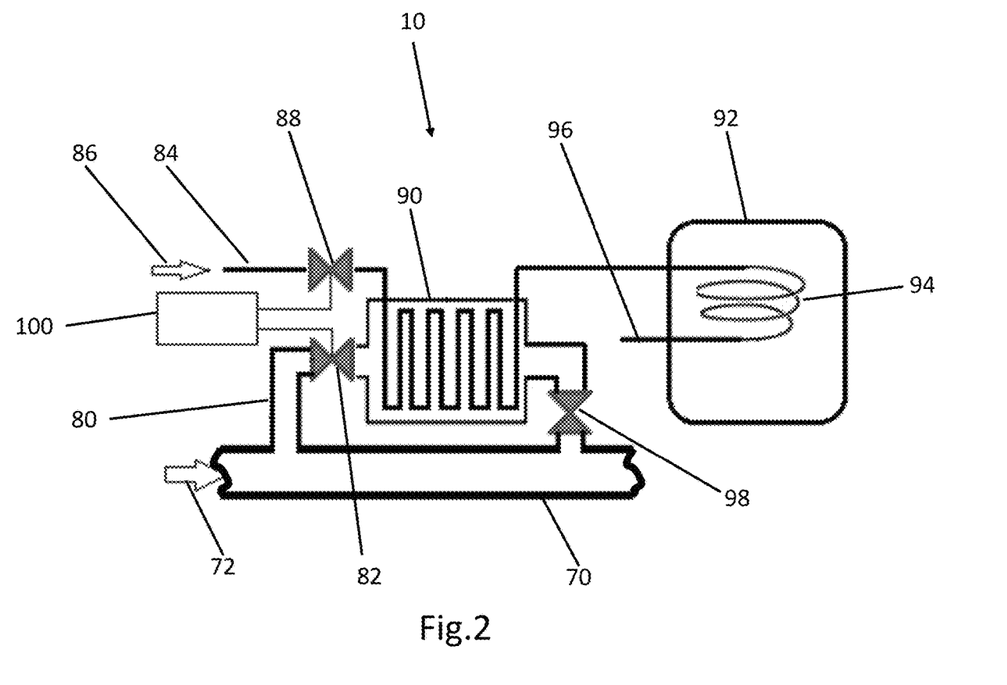
FIG. 2 is a graphic representation of another embodiment of the DEF Thawing Apparatus and Method for Diesel Engine SCR Systems according to the present disclosure, as described herein.

Turning to FIG. 2, another embodiment of a DEF Thawing Apparatus 10 for Diesel Engine SCR Systems is shown. A diesel engine (not shown) is again connected to an exhaust pipe 70 that directs exhaust flow 72 to an SCR catalytic device (not shown). An exhaust pipe branch 80 is again connected to the exhaust pipe 70. In the embodiment of the DEF Thawing Apparatus 10 for Diesel Engine SCR Systems shown in FIG. 2 the exhaust pipe branch 80 directs some of exhaust flow 72 through an exhaust gas to coolant heat exchanger 90. In this way, the exhaust flow 72 heats some of the coolant flow 86 coming from the engine cooling system (not shown) by way of a coolant pipe 84 from the engine, which heated coolant flow 86 is then directed through a coolant to DEF heat exchanger 94 located in the DEF tank 92, thereby thawing the DEF in the DEF tank 92. The coolant flow 96 from the coolant to DEF heat exchanger 94 is then returned to the engine cooling system.

An exhaust gas control valve 82 is provided in the exhaust pipe branch 80, and is connected to an ECM 100. A coolant control valve 88 is provided in the coolant pipe 84 from the engine, and is also connected to the ECM 100. A check valve 98 may be provided in the exhaust pipe branch 80 after the exhaust gas to coolant heat exchanger 90, in order to prevent backflow of the exhaust. The ECM 100 may control the amount or percentage that the exhaust gas control valve 82 opens, and may control the amount or percentage that the coolant control valve 88 opens, in such a way as to provide sufficient exhaust flow 72 and/or coolant flow 86 to quickly and efficiently melt the DEF within the DEF tank 92 by way of the coolant to DEF heat exchanger 94, without exceeding the decomposition temperature of the DEF at any point along the coolant to DEF heat exchanger 94.

To allow the ECM 100 to determine how much exhaust flow 72 to allow to pass through the exhaust gas to coolant heat exchanger 90 by way of the exhaust gas control valve 82, the ECM 100 may receive temperature measurements from temperature sensors (not shown) located within the exhaust flow 72 in the exhaust pipe 70, within the exhaust flow 72 in the exhaust pipe branch 80, and/or within the exhaust flow 72 in the exhaust gas to coolant heat exchanger 90. Similarly, to allow the ECM 100 to determine how much coolant flow 86 to allow to pass through the exhaust gas to coolant heat exchanger 90 and through the coolant to DEF heat exchanger 94, by way of the coolant control valve 88, the ECM 100 may receive temperature measurements from temperature sensors (not shown) located within the coolant flow 86 in the coolant pipe 84 from the engine, within the coolant flow 86 in the exhaust gas to coolant heat exchanger 90, within the coolant flow 86 in the coolant to DEF heat exchanger 94, and/or within the coolant flow 86 returning to the engine.

The ECM 100 may further receive temperature measurements of the DEF from temperature sensors (not shown) located at one or more locations within the DEF tank 92, which may also be used by the ECM 100 to determine how much or what percentage of exhaust flow 72 to allow to pass through the exhaust gas to coolant heat exchanger 90 and/or how much or what percentage of coolant flow 86 to allow to pass through exhaust gas to coolant heat exchanger 90 and coolant to DEF heat exchanger 94. The ECM 100 is further connected to a DEF pump (not shown) and/or to a DEF injector (not shown) upstream of the SCR catalytic device (not shown), in order to control the injection of DEF into the exhaust flow 72. The ECM 100 may further manage injection of DEF into the exhaust flow 72 as a function of the temperature of the exhaust flow 72, the temperature of the coolant flow 86, and/or the state of thaw and/or temperature of the DEF in the DEF tank 92. The ECM 100 may activate the DEF pump and DEF injector, either fully or partially, in various algorithmic proportions between exhaust flow 72, exhaust temperature, coolant flow 86, coolant temperature, DEF temperature, and amount of DEF injected.

Figure 3:
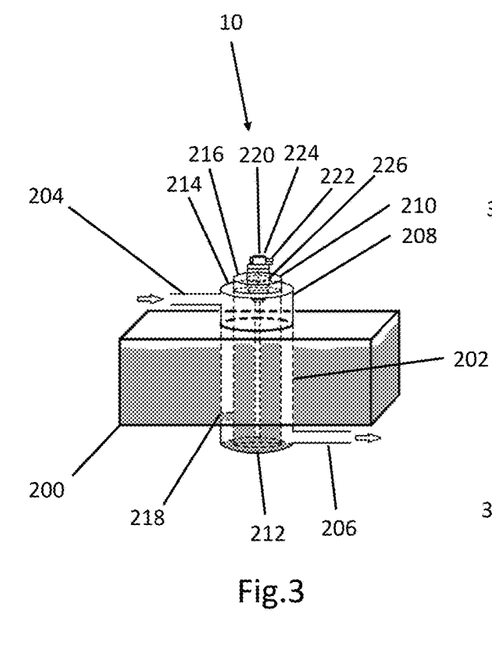
FIG. 3 is a perspective view of another embodiment of the DEF Thawing Apparatus and Method for Diesel Engine SCR Systems according to the present disclosure, as described herein.

Referring now to FIG. 3, another embodiment of a DEF Thawing Apparatus 10 for Diesel Engine SCR Systems is shown, with particular attention being paid to the form of the exhaust gas to DEF heat exchanger 202 within the DEF tank 200. Specifically, the exhaust gas to DEF heat exchanger 202 includes an outer cylinder 208 and an inner cylinder 210. The outer cylinder 208 is provided with an outer cylinder upper cover 214 and a lower cover 212. The inner cylinder 210 is provided with an inner cylinder upper cover 216, and shares the lower cover 212 with the outer cylinder 208. The outer cylinder 208 penetrates through the DEF tank 200, so that it extends beyond the top and bottom of the DEF tank 200. The inner cylinder 210 is concentric with the outer cylinder 208, and extends beyond the top of the outer cylinder 208. A DEF head 220 is attached to an orifice and flange 226 in the outer cylinder upper cover 214, and is provided with a DEF outlet pipe 222 for delivery of DEF to the exhaust pipe (not shown) upstream of the SCR catalytic device (not shown).

Exhaust gas flows into the annular space between the inner cylinder 210 and the outer cylinder 208 by way of an exhaust gas inlet pipe 204, and flows out of the annular space between the inner cylinder 210 and the outer cylinder 208 by way of an exhaust gas outlet pipe 206. Meanwhile, DEF is admitted to the inside of the inner cylinder 210 by way of a DEF entrance 218. In this way, the hot exhaust gas is able to rapidly thaw the volume of DEF within the inner cylinder 210 for quicker DEF flow availability under cold ambient startup conditions. Once the DEF within the inner cylinder 210 is thawed, flow of exhaust through the DEF Thawing Apparatus 10 may be restricted using an exhaust gas control valve (not shown), thereby avoiding overheating the DEF within the inner cylinder 210, and yet continuing to melt the DEF in the DEF tank 200 outside of the outer cylinder 208. A DEF level sensor 224 is located within the inner cylinder 210 attached to the DEF head 220, and may be used by the ECM (not shown), possibly along with temperature sensors located in the exhaust flow, in the DEF tank 200, and/or within the inner cylinder 210, to determine the amount or percentage of opening of the exhaust gas control valve.

Figure 4:
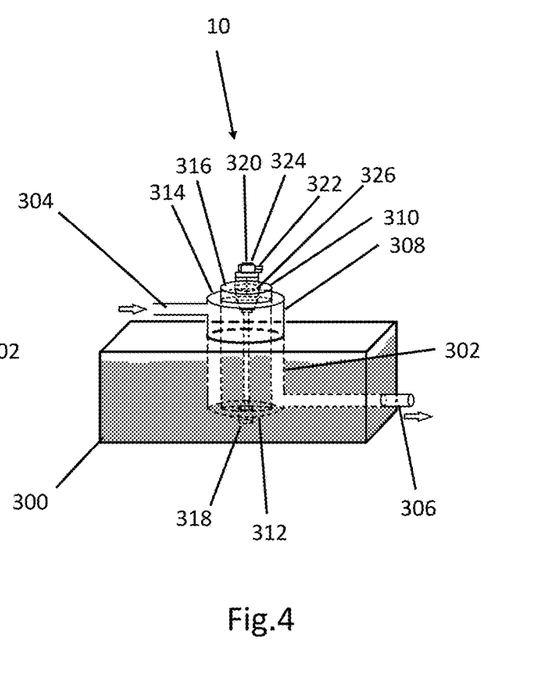
FIG. 4 is a perspective view of another embodiment of the DEF Thawing Apparatus and Method for Diesel Engine SCR Systems according to the present disclosure, as described herein.

A similar embodiment of a DEF Thawing Apparatus 10 for Diesel Engine SCR Systems is shown in FIG. 4. A DEF heater 302 is again located within the DEF tank 300, and includes an inner cylinder 310 and an outer cylinder 308. The outer cylinder 308 is again provided with an outer cylinder upper cover 314 and a lower cover 312. The inner cylinder 310 is again provided with an inner cylinder upper cover 316, and shares the lower cover 312 with the outer cylinder 308. The outer cylinder 308 again penetrates through the DEF tank 300, but only extends beyond the top of the DEF tank 300. The inner cylinder 310 is again concentric with the outer cylinder 308, and extends beyond the top of the outer cylinder 308. A DEF head 320 is again attached to an orifice and flange 326 in the outer cylinder upper cover 314, and is provided with a DEF outlet pipe 322 for delivery of DEF to the exhaust pipe (not shown) upstream of the SCR catalytic device (not shown).

Exhaust gas again flows into the annular space between the inner cylinder 310 and the outer cylinder 308 by way of an exhaust gas inlet pipe 304, and flows out of the annular space between the inner cylinder 310 and the outer cylinder 308 by way of an exhaust gas outlet pipe 306. Meanwhile, DEF is admitted to the inside of the inner cylinder 310 by way of a DEF entrance 318, in the embodiment of FIG. 4 being located in the shared lower cover 312. As before, the hot exhaust gas is able to rapidly thaw the volume of DEF within the inner cylinder 310 for quicker DEF flow availability under cold ambient startup conditions. Once the DEF within the inner cylinder 310 is thawed, flow of exhaust through the DEF Thawing Apparatus 10 may be restricted using an exhaust gas control valve (not shown), thereby avoiding overheating the DEF within the inner cylinder 310, and yet continuing to melt the DEF in the DEF tank 300 outside of the outer cylinder 308. Because the outer cylinder 308 does not extend beyond the bottom of the DEF tank 300, the exhaust gas outlet pipe 306 is at least partially located within the confines of the DEF tank 300, thereby supplementing the heat transfer from the exhaust gas to the DEF outside the outer cylinder 308. A DEF level sensor 324 is again located within the inner cylinder 310 attached to the DEF head 320, and may be used by the ECM (not shown), possibly along with temperature sensors located in the exhaust flow, in the DEF tank 300, and/or within the inner cylinder 310, to determine the amount or percentage of opening of the exhaust gas control valve.

While the DEF Thawing Apparatus and Method for Diesel Engine SCR Systems has been described with respect to at least one embodiment, the arrangement and method can be further modified within the spirit and scope of this disclosure, as demonstrated previously. This application is therefore intended to cover any variations, uses, or adaptations of the system and method using its general principles. Further, this application is intended to cover such departures from the present disclosure as come within known or customary practice in the art to which the disclosure pertains and which fall within the limits of the appended claims.

What is claimed is:

1. A vehicle having a Diesel Exhaust Fluid Thawing Apparatus, comprising:
    an engine;
    an Engine Control Module connected to the engine and configured to control the engine;
    an exhaust system connected to the engine;
    a selective catalytic reduction device connected to the exhaust system;
    a Diesel Exhaust Fluid injection system connected to the exhaust system upstream of the selective catalytic reduction device, and further connected to the Engine Control Module;
    a Diesel Exhaust Fluid tank connected to the Diesel Exhaust Fluid injection system;
    an exhaust pipe branch connected to the exhaust system;
    a heat exchanging apparatus connected to the exhaust pipe branch and configured to exchange heat from exhaust gas within the exhaust pipe branch to the Diesel Exhaust Fluid in the Diesel Exhaust Fluid tank;
    an exhaust gas control valve located in the exhaust pipe branch and being connected to the Engine Control Module;
    an exhaust gas to Diesel Exhaust Fluid heat exchanger located at least partially within the Diesel Exhaust Fluid tank;
    wherein the exhaust gas to Diesel Exhaust Fluid heat exchanger further comprises:
    an outer cylinder having an outer cylinder upper cover and a lower cover,
    an inner cylinder having an inner cylinder upper cover, and sharing the lower cover with the outer cylinder, and
    the inner cylinder being concentric with the outer cylinder and extending beyond the top of the outer cylinder; and
    wherein
    the exhaust pipe branch includes an exhaust gas inlet pipe that directs exhaust gas into an annular space between the inner cylinder and the outer cylinder at a first end of the outer cylinder;
    the exhaust pipe branch further includes an exhaust gas outlet pipe that directs exhaust gas out of the annular space between the inner cylinder and the outer cylinder at a second end of the outer cylinder; and
    Diesel Exhaust Fluid being admitted to the inside of the inner cylinder from the Diesel Exhaust Fluid tank by way of a Diesel Exhaust Fluid entrance.

2. The vehicle of claim 1, further comprising:
    at least one exhaust temperature sensor connected to the Engine Control Module and being located at least one of:
    within exhaust flow in the exhaust system,
    within exhaust flow in the exhaust pipe branch, and
    within exhaust flow in the exhaust gas to Diesel Exhaust Fluid heat exchanger.

3. The vehicle of claim 1, wherein:
    the outer cylinder penetrates through the Diesel Exhaust Fluid tank and extends beyond the top and bottom of the Diesel Exhaust Fluid tank;
    the exhaust gas outlet pipe being arranged outside of the Diesel Exhaust Fluid tank; and
    the Diesel Exhaust Fluid entrance passing through the annular space between the inner cylinder and the outer cylinder.

4. The vehicle of claim 1, wherein:
    the outer cylinder penetrates through the Diesel Exhaust Fluid tank and extends only beyond the top of the Diesel Exhaust Fluid tank;
    the exhaust gas outlet pipe being arranged at least partially inside of the Diesel Exhaust Fluid tank; and the Diesel Exhaust Fluid entrance passing through the bottom cover of the inner cylinder and the outer cylinder.

5. The vehicle of claim 1, wherein:
    the heat exchanging apparatus further comprising:
    an exhaust gas to coolant heat exchanger being connected to an engine coolant circuit and being arranged to transfer heat from the exhaust gas to engine coolant;
    a coolant to Diesel Exhaust Fluid heat exchanger located at least partially within the Diesel Exhaust Fluid tank, being connected to the engine coolant circuit, and being arranged to transfer heat from the engine coolant to the Diesel Exhaust Fluid in the Diesel Exhaust Fluid tank; and a coolant control valve located in the engine coolant circuit and being connected to the Engine Control Module.

6. The vehicle of claim 5, further comprising:

at least one exhaust temperature sensor connected to the Engine Control Module and being located at least one of:

within exhaust flow in the exhaust system, within exhaust flow in the exhaust pipe branch, and within exhaust flow in the exhaust gas to Diesel Exhaust Fluid heat exchanger; and at least one coolant temperature sensor connected to the Engine Control Module and being located at least one of:

within coolant flow in the engine coolant circuit, within coolant flow in the exhaust gas to coolant heat exchanger, within coolant flow in the coolant to Diesel Exhaust Fluid heat exchanger, and within coolant flow returning to the engine.

7. The vehicle of claim 1, further comprising:

at least one Diesel Exhaust Fluid temperature sensor connected to the Engine Control Module and being located within the Diesel Exhaust Fluid tank proximate to at least one component of the heat exchanging apparatus.

8. The vehicle of claim 1, further comprising:

a check valve located within the exhaust pipe branch after the heat exchanging apparatus.

9. A Diesel Exhaust Fluid Thawing Apparatus of a vehicle having an engine, an Engine Control Module connected to the engine and configured to control the engine, and an exhaust system connected to the engine and having an SCR catalytic device, comprising:

a Diesel Exhaust Fluid injection system connected to the exhaust system upstream of the SCR catalytic device, and further connected to the Engine Control Module;

a Diesel Exhaust Fluid tank connected to the Diesel Exhaust Fluid injection system;

an exhaust pipe branch connected to the exhaust system; and a heat exchanging apparatus connected to the exhaust pipe branch and configured to exchange heat from exhaust gas within the exhaust pipe branch to the Diesel Exhaust Fluid in the Diesel Exhaust Fluid tank;

an exhaust gas control valve located in the exhaust pipe branch and being connected to the Engine Control Module;

the heat exchanging apparatus further comprising:

an exhaust gas to Diesel Exhaust Fluid heat exchanger located at least partially within the Diesel Exhaust Fluid tank;

at least one exhaust temperature sensor connected to the Engine Control Module and being located at least one of:

within exhaust flow in the exhaust system, within exhaust flow in the exhaust pipe branch, and within exhaust flow in the exhaust gas to Diesel Exhaust Fluid heat exchanger;

an outer cylinder having an outer cylinder upper cover and a lower cover, an inner cylinder having an inner cylinder upper cover, and sharing the lower cover with the outer cylinder, and the inner cylinder being concentric with the outer cylinder and extending beyond the top of the outer cylinder; and wherein the exhaust pipe branch includes an exhaust gas inlet pipe that directs exhaust gas into an annular space between the inner cylinder and the outer cylinder at a first end of the outer cylinder;

the exhaust pipe branch further includes an exhaust gas outlet pipe that directs exhaust gas out of the annular space between the inner cylinder and the outer cylinder at a second end of the outer cylinder; and Diesel Exhaust Fluid being admitted to the inside of the inner cylinder from the Diesel Exhaust Fluid tank by way of a Diesel Exhaust Fluid entrance.

10. The Diesel Exhaust Fluid Thawing Apparatus of claim 9, wherein:

the outer cylinder penetrates through the Diesel Exhaust Fluid tank and extends beyond the top and bottom of the Diesel Exhaust Fluid tank;

the exhaust gas outlet pipe being arranged outside of the Diesel Exhaust Fluid tank; and the Diesel Exhaust Fluid entrance passing through the annular space between the inner cylinder and the outer cylinder.

11. The Diesel Exhaust Fluid Thawing Apparatus of claim 9, wherein:

the outer cylinder penetrates through the Diesel Exhaust Fluid tank and extends only beyond the top of the Diesel Exhaust Fluid tank;

the exhaust gas outlet pipe being arranged at least partially inside of the Diesel Exhaust Fluid tank; and the Diesel Exhaust Fluid entrance passing through the bottom cover of the inner cylinder and the outer cylinder.

12. The Diesel Exhaust Fluid Thawing Apparatus of claim 9, wherein:

the heat exchanging apparatus further comprising:

an exhaust gas to coolant heat exchanger being connected to an engine coolant circuit and being arranged to transfer heat from the exhaust gas to engine coolant;

a coolant to Diesel Exhaust Fluid heat exchanger located at least partially within the Diesel Exhaust Fluid tank, being connected to the engine coolant circuit, and being arranged to transfer heat from the engine coolant to the Diesel Exhaust Fluid in the Diesel Exhaust Fluid tank; and a coolant control valve located in the engine coolant circuit and being connected to the Engine Control Module.

13. The Diesel Exhaust Fluid Thawing Apparatus of claim 12, further comprising:

at least one exhaust temperature sensor connected to the Engine Control Module and being located at least one of:

within exhaust flow in the exhaust system, within exhaust flow in the exhaust pipe branch, and within exhaust flow in the exhaust gas to Diesel Exhaust Fluid heat exchanger; and at least one coolant temperature sensor connected to the Engine Control Module and being located at least one of:

within coolant flow in the engine coolant circuit, within coolant flow in the exhaust gas to coolant heat exchanger, within coolant flow in the coolant to Diesel Exhaust Fluid heat exchanger, and within coolant flow returning to the engine.

14. The Diesel Exhaust Fluid Thawing Apparatus of claim 9, further comprising:
at least one Diesel Exhaust Fluid temperature sensor connected to the Engine Control Module and being located within the Diesel Exhaust Fluid tank proximate to at least one component of the heat exchanging apparatus.

15. The Diesel Exhaust Fluid Thawing Apparatus of claim 9, further comprising:
a check valve located within the exhaust pipe branch after the heat exchanging apparatus.

16. A method of thawing Diesel Exhaust Fluid in a vehicle having an engine, an Engine Control Module connected to the engine and configured to control the engine, an exhaust system connected to the engine and having selective catalytic reduction device, and a Diesel Exhaust Fluid injection system connected to the exhaust system and having a Diesel Exhaust Fluid tank, comprising the steps of:
connecting an exhaust pipe branch to the exhaust system;
connecting a heat exchanging apparatus to the exhaust pipe branch;
configuring the heat exchanging apparatus to exchange heat from exhaust gas within the exhaust pipe branch to the Diesel Exhaust Fluid in the Diesel Exhaust Fluid tank;
providing an exhaust gas control valve in the exhaust pipe branch and connecting the exhaust gas control valve to the Engine Control Module;
locating at least one exhaust temperature sensor in the exhaust system and/or in the exhaust pipe branch, and connecting the at least one exhaust temperature sensor to the Engine Control Module;
locating at least one Diesel Exhaust Fluid temperature sensor within the Diesel Exhaust Fluid tank proximate to at least one component of the heat exchanging apparatus, and connecting the at least one Diesel Exhaust Fluid temperature sensor to the Engine Control Module; and
controlling the exhaust gas control valve by way of the Engine Control Module as a function of a temperature of exhaust flow within the exhaust system and/or within the exhaust pipe branch, and as a function of state of thaw and/or temperature of the Diesel Exhaust Fluid in the Diesel Exhaust Fluid tank;
controlling by way of the Engine Control Module a percentage of opening of the exhaust gas control valve in such a way as to provide sufficient exhaust flow to pass through a component of the heat exchanging apparatus to quickly and efficiently melt the Diesel Exhaust Fluid within the Diesel Exhaust Fluid tank without exceeding a decomposition temperature of the Diesel Exhaust Fluid at any point where the heat exchanging apparatus comes into contact with the Diesel Exhaust Fluid;
the heat exchanging apparatus further comprising:
an exhaust gas to Diesel Exhaust Fluid heat exchanger located at least partially within the Diesel Exhaust Fluid tank;
the exhaust gas to Diesel Exhaust Fluid heat exchanger further comprises:
an outer cylinder having an outer cylinder upper cover and a lower cover,
an inner cylinder having an inner cylinder upper cover, and sharing the lower cover with the outer cylinder,
the inner cylinder being concentric with the outer cylinder and extending beyond the top of the outer cylinder;
wherein
the exhaust pipe branch includes an exhaust gas inlet pipe that directs exhaust gas into an annular space between the inner cylinder and the outer cylinder at a first end of the outer cylinder;
the exhaust pipe branch further includes an exhaust gas outlet pipe that directs exhaust gas out of the annular space between the inner cylinder and the outer cylinder at a second end of the outer cylinder; and
Diesel Exhaust Fluid being admitted to the inside of the inner cylinder from the Diesel Exhaust Fluid tank by way of a Diesel Exhaust Fluid entrance.

17. The method of claim 16, wherein:
the outer cylinder penetrates through the Diesel Exhaust Fluid tank and extends beyond the top and bottom of the Diesel Exhaust Fluid tank;
the exhaust gas outlet pipe being arranged outside of the Diesel Exhaust Fluid tank; and
the Diesel Exhaust Fluid entrance passing through the annular space between the inner cylinder and the outer cylinder.

18. The method of claim 16, wherein:
the outer cylinder penetrates through the Diesel Exhaust Fluid tank and extends only beyond the top of the Diesel Exhaust Fluid tank;
the exhaust gas outlet pipe being arranged at least partially inside of the Diesel Exhaust Fluid tank; and the Diesel Exhaust Fluid entrance passing through the bottom cover of the inner cylinder and the outer cylinder.

19. The method of claim 16, wherein:
the heat exchanging apparatus further comprising:
an exhaust gas to coolant heat exchanger being connected to an engine coolant circuit and being arranged to transfer heat from the exhaust gas to engine coolant;
a coolant to Diesel Exhaust Fluid heat exchanger located at least partially within the Diesel Exhaust Fluid tank, being connected to the engine coolant circuit, and being arranged to transfer heat from the engine coolant to the Diesel Exhaust Fluid in the Diesel Exhaust Fluid tank; and
a coolant control valve located in the engine coolant circuit and being connected to the Engine Control Module.

20. The method of claim 19, wherein:
at least one coolant temperature sensor being connected to the Engine Control Module and being located at least one of:
within coolant flow in the engine coolant circuit,
within coolant flow in the exhaust gas to coolant heat exchanger, within coolant flow in the coolant to Diesel Exhaust Fluid heat exchanger, and within coolant flow returning to the engine; and
further controlling by way of the Engine Control Module a percentage of opening of the coolant control valve in such a way as to provide sufficient coolant flow to pass through the coolant to Diesel Exhaust Fluid heat exchanger to quickly and efficiently melt the Diesel Exhaust Fluid within the Diesel Exhaust Fluid tank without exceeding a decomposition temperature of the Diesel Exhaust Fluid at any point where the coolant to Diesel Exhaust Fluid heat exchanger comes into contact with the Diesel Exhaust Fluid.

21. The method of claim 19, wherein:
at least one coolant temperature sensor being connected to the Engine Control Module and being located at least one of:
   within coolant flow in the engine coolant circuit,
   within coolant flow in the exhaust gas to coolant heat exchanger,
   within coolant flow in the coolant to Diesel Exhaust Fluid heat exchanger, and within coolant flow returning to the engine; and
further controlling by way of the Engine Control Module a percentage of opening of the coolant control valve in such a way as to provide sufficient coolant flow to pass through the coolant to Diesel Exhaust Fluid heat exchanger to quickly and efficiently melt the Diesel Exhaust Fluid within the Diesel Exhaust Fluid tank without exceeding a decomposition temperature of the Diesel Exhaust Fluid at any point where the coolant to Diesel Exhaust Fluid heat exchanger comes into contact with the Diesel Exhaust Fluid.

* * * * *